United States Patent [19]
Bower

[11] 3,970,107
[45] July 20, 1976

[54] ROLL OVER VALVE FOR TANK TRUCK
[75] Inventor: Allen M. Bower, Painsville, Ohio
[73] Assignee: Emco Ltd., London, Canada
[22] Filed: Apr. 15, 1975
[21] Appl. No.: 568,345

Related U.S. Application Data
[63] Continuation-in-part of Ser. No. 506,941, Sept. 18, 1974, abandoned.

[52] U.S. Cl. .............................. 137/587; 137/267
[51] Int. Cl.² .................................... F16K 24/00
[58] Field of Search ........................... 137/587, 267

[56] References Cited
UNITED STATES PATENTS

| | | | |
|---|---|---|---|
| 1,985,207 | 12/1934 | Jensen | 137/267 |
| 2,748,799 | 6/1956 | Rath | 137/587 |
| 3,770,011 | 11/1973 | Muehl | 137/587 |

*Primary Examiner*—William R. Cline
*Assistant Examiner*—H. Jay Spiegel
*Attorney, Agent, or Firm*—Fetherstonhaugh & Co.

[57] ABSTRACT

In a gasoline or like tank truck, a roll over valve is provided which permits opening of the emergency valve of the tank truck without opening the vent valve. The roll over valve is incorporated in the air lines extending between the source of compressed air and the emergency valve. The roll over valve includes a valve closure member movable between a first position in which the emergency valve is activated by the same air pressure source as the vent valve and a second position in which the emergency valve is adapted to be activated by an independent source of air without permitting the independent source to activate the vent valve.

3 Claims, 4 Drawing Figures

ROLL OVER VALVE FOR TANK TRUCK

Related Application

This application is a continuation-in-part of United States application Ser. No. 506,941, filed Sept. 18, 1974, now abandoned.

FIELD OF INVENTION

This invention relates to an air operated drain and roll over valve for use in a gasoline or like tank truck for the purpose of controlling the opening and closure of the vent at the top of the tank and the valve at the bottom of the tank.

PRIOR ART

It is common practice to transport gasoline and like materials in tank trucks, the bodies of which are divided into a series of compartments to form a series of individual tanks. These tanks are, under normal conditions, filled with gasoline through a valve at the bottom of the tank. The tank also has a valve at its top for venting. Under normal conditions of loading and unloading, the fill valve at the bottom and the vent valve at the top are each open. When loading and/or unloading is terminated they are each operated to the closed position. Conditions do occur, however, where it is desired to open only one of the valves. For example, in the event that a tank truck should roll over to dispose the vent valve lower than the fill valve, one must provide for the opening of the fill valve only in order to remove the contents of the tank prior to righting the truck. Thus, while ordinarily the vent is opened when the fill valve is open, there are instances such as the case of the tank truck accidentally rolling over where it is necessary to open only the fill valve in order to remove the gasoline from the tank and right the vehicle. The fill valve is normally called an emergency valve.

It is common practice to connect the vent valve and the emergency valve and to operate them from a common air supply. The connection of these valves for normal operation is quite satisfactory because, as indicated above, one always requires that the vent valve be opened when the tank is being filled or emptied through the emergency valve. Provision is also made, however, for emergency operation of the valves such as in the case of roll over. One must provide for the opening of the emergency valve only. In the past, it has been practice to provide two additional tank air connections and a shuttle valve capable of supplying air to the emergency valve only so that in cases of roll over, one can open the emergency valve to empty the tank without opening the vent valve.

SUMMARY

The provision of the additional through tank air connections and a shuttle valve has been costly and it is an object of this invention to provide a means for interconnecting the vent valve and the emergency valve so that they can be operated from a common air source under conditions of normal operation as before and can also be operated to open the emergency valve only under conditions of roll over without the requirement of providing additional interconnection between the emergency valve and the vent valve.

This objective is achieved by the use of a drain and roll over valve that comprises; a body, said body having an air supply passage, an air outlet passage and a drain passage; a valve closure member mounted in said body, said air supply passage communicating with said air outlet passage to form a first through passage through said body, said drain passage communicating with said air outlet passage to form a second through passage through said body, a valve seat in said air supply passage of said valve body, said valve closure member being movable between the first position spaced from the valve seat in which said first through passage is open and a second position in which the valve closure member is seated against the valve seat and closes the first through passage and in which the second through passage remains open so as to be connectable to a secondary source of air when the manually operable valve closure members are removed whereby air from the secondary source may operate the emergency valve independently of the vent,

PREFERRED EMBODIMENT

The invention will be clearly understood after reference to the following detailed specification read in conjunction with the drawings.

Figure 1:
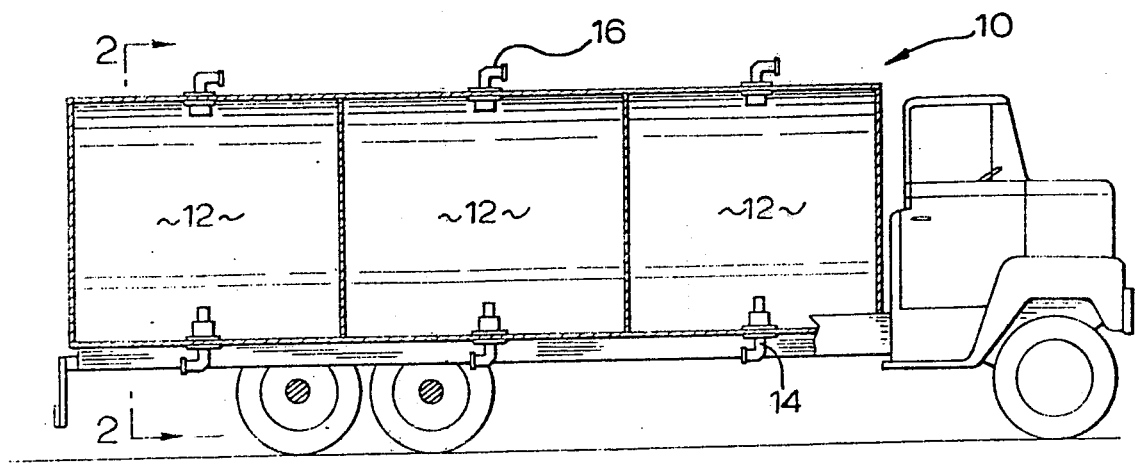
FIG. 1 is a schematic illustration of a tank truck suitable for carrying gasoline.

The numeral 10 refers generally to a tank truck of the type used to transport gasoline or the like. The truck body is divided into compartments 12 and each compartment is fitted at its bottom with an air operated emergency valve 14 and at its top with an air operated vent 16 usually used with a vapour recovery system. Under normal conditions of filling and emptying of the tanks 12, gasoline is loaded through or unloaded through the valve 14. During loading and unloading of the tank, it is necessary to have the vent valve 16 open and it is normal practice to provide for the air operation of the valves 14 and 16. The usual practice is to supply them from a common air supply so that one air supply operates both valves. It is also common to provide for the sequential operation of the valves in a fashion that opens the vent valve 16 before the emergency or fill valve 14. The design of the valves 14 and 16 and the design of sequence valves which permit the operation of valve just prior to the valve 14 are common general knowledge in the trade and detailed reference to their structures will not be made in this specification.

While under ordinary practice of loading or unloading the tank 12, the vent is always open when the emergency valve is open, there are as indicated above instances when it is desired to open only the emergency valve. In case of the truck accidentally rolling over, one must open only the emergency valve in order to remove the gasoline from the tank and right the vehicle. If the vent were opened under these conditions, gasoline would escape through the vent.

It has been common practice to provide for additional air supply lines capable of supplying air to a selected one or other of the valves for use in emergency situations where it is desired to operate only one or other of the valves. These connections are cumbersome, cost money to make and cost money to maintain. With this invention, it is possible to interconnect the two valves in series for simultaneous or sequential operation under normal conditions of operation and also for selective operation of the emergency valve without the cumbersome air supply lines previously used.

Figure 2:
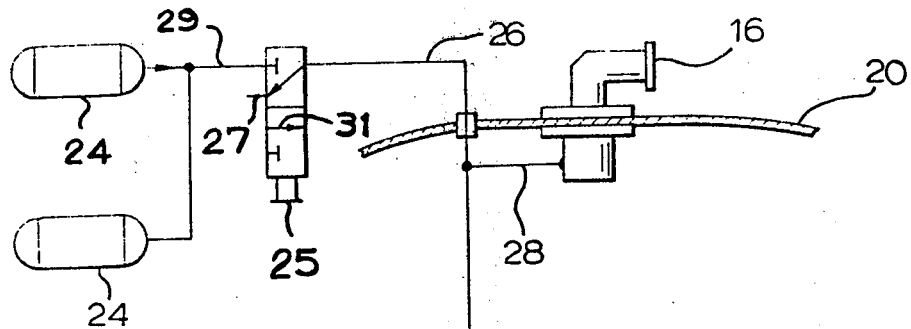
FIG. 2 is a schematic illustration of the top and bottom of a tank truck compartment taken along the lines 2—2 of FIG. 1.

In FIG. 2, the emergency and vent valves 14 and 16 respectively are illustrated mounted in the bottom 18 and top 20 respectively of the tank 12. Numeral 22 refers generally to a drain and roll over valve.

Air to operate the valves 14 and 16 is supplied by a primary air source 24 which may be in the form of one or more compressed air cylinders carried by the vehicle. The supply of air from the compressed air cylinders is controlled by a manually operable air supply valve 25 which has two positions. In the position shown in FIG. 2 of the drawings, the air supply line 26 connects the valves 14 and 16 through lines 28 and 30 respectively to the vent passage 27 of the manually operable air supply valve 25. The valve 25 is manually operable and may be moved to a second position wherein the air supply line 29 from the cylinders 24 is connected through passage 31 to the air supply line 26. The air is supplied from the air supply line 26 through the line 28 to the vent valve 16 and through the line 30 to the emergency valve 14.

Figure 3:
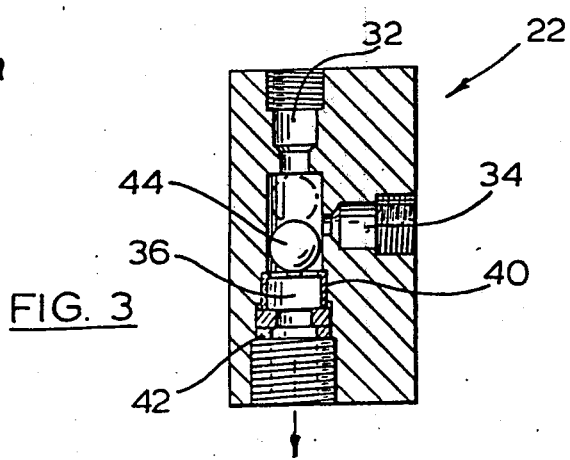
FIG. 3 is a sectional view of a drain and roll over valve.

The drain and roll over valve 22 is illustrated in section in FIG. 3 and it will be noted that it has an air supply passage 32 that connects with supply line 26, an air outlet passage 34 that communicates with the emergency valve through line 30 and a drain passage 36 that is normally closed with a pipe cap 38 on the exterior of the bottom of the tank. Valve 22 has been illustrated on the inside of the tank. In practice it is often mounted on the outside of the tank.

The drain passage has therein a ball retainer 40 that is held in position by collar 42. Ball retainer 40 has a foraminous surface that extends across the drain passage and it is adapted to retain the ball valve 44 in the position illustrated under conditions of normal operation.

Under conditions of normal operation, air supply passage 32 communicates with air outlet passage 34 and there is a through passage through the valve that permits the supply of air to the air operated emergency valve through line 26 and 30 when the air control device 25 is operated to an on position. At the same time, air is supplied to the vent valve 16 through line 28 and it will be apparent that both vent valve and the emergency valve are supplied with air and, under these conditions, both valves operate to an open position. Under normal conditions a cap 38 on an outlet extension pipe for passage 36 blocks the drain passage 36.

If in case of emergency it is desired to open only the emergency valve 14, one removes the cap 38 from the free end of the outlet extension pipe of the air outlet passage 36 and applies air pressure to the open free end of the outlet extension pipe whereby to pressurize the drain passage 36. The air pressure forces the ball valve 44 upwardly against a seat in the air inlet passage 32 as illustrated in the dotted line position of FIG. 3 to close off the air inlet passage from the air outlet passage. The ball valve 44 occupies the dotted line position and an air passage through the drain and roll over valve is established through drain passage 36 and through outlet passage 34 to the emergency valve. Under these conditions of operation, the emergency valve only is supplied with operating air pressure and it opens.

The supply of air to the drain valve can be obtained from any convenient source. It could for example be obtained from an external hose line and an appropriate valve connection from the same supply as is used to normally supply air to both valves.

It will be noted that the valve 22 has been designated as a drain and roll over valve. Experience with air operated vent and emergency valves in gasoline tank trucks has shown that if the air supply line is run directly down from the vent to the emergency valve, water that condenses in this vertical tubing tends to gravitate to the emergency valve where it can freeze or corrode the valve. The solution to this problem has been to run the tubing down to a T-connection at the bottom of the tank and then run tubing from the T to the emergency valve. The third leg of the T is connected to a nipple or coupling that extends through the bottom of the tank. This is capped and the cap is removable so that water that condenses out of the air in the tubing can accumulate in the low point of the system in the T and be emptied periodically by removal of the cap on the T-connection.

The drain and roll over valve 22 is adapted to perform the function of this T. It will be noted that the drain passage 36 thereof has an opening that extends to the outside bottom of the truck and in use, the cap thereof is removable to permit the drainage of any water that may form.

It will be apparent that from the foregoing, applicant has devised a simple and effective means for operating the vent and emergency valves on a tank truck under normal and emergency conditions with a minimum of tank connections. Embodiments of the invention other than the one illustrated will be apparent to those skilled in the art and it is not intended that the invention should be restricted to the embodiment illustrated.

Figure 4:
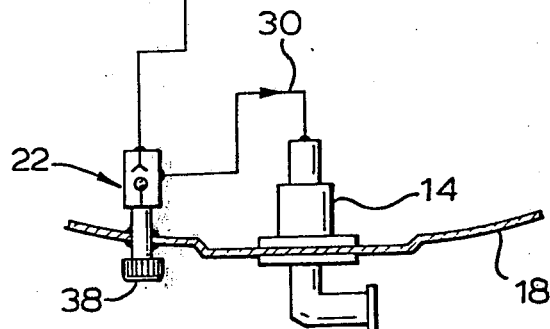
FIG. 4 is a sectional view of a drain and roll over valve according to a further embodiment of the present invention.
Figure 4:
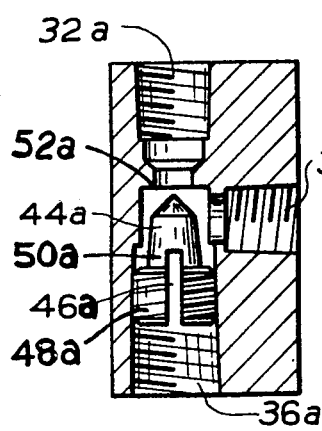

A modified drain and roll over valve 22a is illustrated in FIG. 4 of the drawings. The valve 22a is formed to provide an air supply passage 32a that connects with the supply line 26, an air outlet passage 34a that communicates with the emergency valve 14 through line 30 and a drain passage 36a which is normally closed with a pipe cap 38 on the exterior of the bottom of the tank. The drain passage 36a is threaded. A needle valve 44a has a head portion 48a which is threaded and adapted to be threadably mounted in a drain passage 36a. The needle valve 44a also includes a portion 50a of lesser diameter than the head portion 48a. An elongated slot 46a is formed in the needle valve 44 and extends inwardly from one end thereof to a depth which is greater than the length of the threaded head portion 48a so that the passage 46a forms a permanent through passage communicating between the air outlet passage 34a and the drain passage 36a which can only be closed by the pipe cap 38. The portion 50a has a tapered point at the inner end thereof which is adapted to bear against the seat 52a formed at the inner end of the air supply passage 32 to close the air supply passage 32a when rotatably driven into engagement with the seat 52a.

In use the needle valve 44a is located in the position shown in FIG. 4 of the drawings during the normal operation of the tank truck. In the event of a roll over of the tank truck, the cap 38 is removed and by means of a screw driver or the like the needle valve 44 is rotatably driven in the passage 36a towards the seat 52a until the air supply passage 32a is closed by the needle valve 44a. Air is then supplied by way of the passage 36a, slot 46a and air output passage 34a to open the emergency valve 14 to permit the tank to be drained.

The drain and roll over valves 22 and 22a each have the common characteristic that the drain passages 36 and 36a are not closed by the valve members 44 and 44a but are closed by the closure cap 38 which may be manually removed. In this respect, the drain and roll over valves are distinctly different from conventional shuttle valves and it is this characteristic which permits these devices to operate effectively as drain valves as well as vent control valves.

What I claim as my invention is:

1. A gasoline or like tank truck assembly comprising a tank having a top and a bottom,
   an air operable vent on said top of said tank,
   an air operable emergency valve on said bottom of said tank,
   a drain and roll over valve having a body on the bottom of said tank,
   said body of said drain and roll over valve having an air supply passage, an air outlet passage and a drain passage,
   a manually operable closure for said drain passage of said drain and roll over valve accessible from the outside of said tank,
   said air supply passage communicating with said air outlet passage to form a through passage through said body of said drain and roll over valve,
   said drain passage communicating with said air outlet passage of said body of said drain and roll over valve to form a through passage through said body of said drain and roll over valve,
   a check valve,
   a retainer in said drain passage for said check valve,
   a seat in said air supply passage for said check valve, said check valve being free to move between said retainer and said seat,
   said retainer being adapted to retain said check valve when air pressure is applied to said air supply passage,
   said seat being adapted to seat said check valve whereby to close said air supply passage to said drain passage when said closure for said drain passage is opened and air pressure is applied to said drain passage,
   an air supply valve having an outlet,
   manual operating means for said air supply valve accessible from outside said tank for connecting said outlet of said air supply valve to said air operable vent and to said air supply passage of said drain and roll over valve,
   said air outlet passage of said drain and roll over valve being connected to said air operable emergency valve.

2. A gasoline or like tank truck assembly comprising a tank having a top and a bottom,
   an air operable vent on said top of said tank,
   an air operable emergency valve on said bottom of said tank,
   a drain and roll over valve having a body on the bottom of said tank,
   said body of said drain and roll over valve having an air supply passage, an air outlet passage and a drain passage,
   a manually operable closure for said drain passage of said drain and roll over valve accessible from the outside of said tank,
   said air supply passage communicating with said air outlet passage to form a first through passage through said body of said drain and roll over valve,
   said drain passage communicating with said air outlet passage of said body of said drain and roll over valve to form a second through passage through said body of said drain and roll over valve,
   a valve closure member mounted in said body of said drain and roll over valve,
   a valve seat in said air supply passage of said body,
   said valve closure member being movable between a first position spaced from said seat in which first through passage is open and a second position in which the valve closure member is seated against said valve seat and closes said first through passage and in which said second through passage remains open so as to be connectible to a secondary source of air when said manually operable closure member is removed whereby air from the secondary source may operate said emergency valve independently of said vent,
   an air supply valve having an outlet,
   manual operating means for said air supply valve accessible from outside said tank for connecting said outlet of said air supply valve to said air operable vent and to said air supply passage of said drain and roll over valve,
   said air outlet passage of said drain and roll over valve being connected to said air operable emergency valve.

3. A gasoline or like tank truck assembly as claimed in claim 2 wherein said valve closure member comprises a body having a head portion threadably mounted in said drain passage and a stem portion of reduced diameter projecting towards said valve seat, slot means extending longitudinally through said head portion and opening into said stem portion to provide a permanent passage communicating between said drain passage and said air outlet passage, said valve closure passage being rotatable within said drain passage for movement between a position wherein said stem portion seats against said valve seat to close air supply passage and a position in which said valve stem is spaced from said air supply passage to open said air supply passage for communication between said air supply passage and said air outlet passage.

* * * * *